(12) United States Patent
Fuse et al.

(10) Patent No.: US 8,032,590 B2
(45) Date of Patent: Oct. 4, 2011

(54) INFORMATION DISTRIBUTION SYSTEM AND INFORMATION DISTRIBUTION METHOD

(75) Inventors: Tohru Fuse, Tokyo (JP); Yukiyo Uehori, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 920 days.

(21) Appl. No.: 11/511,415

(22) Filed: Aug. 29, 2006

(65) Prior Publication Data

US 2007/0192808 A1 Aug. 16, 2007

(30) Foreign Application Priority Data

Feb. 10, 2006 (JP) ................................. 2006-034587

(51) Int. Cl.
*G06F 15/16* (2006.01)
(52) U.S. Cl. .................. 709/204; 709/205; 715/201
(58) Field of Classification Search .......... 709/204–207; 715/201
See application file for complete search history.

(56) References Cited

U.S. PATENT DOCUMENTS

| | | | | |
|---|---|---|---|---|
| 5,619,554 A * | 4/1997 | Hogan et al. | ................. | 379/88.1 |
| 2002/0133339 A1* | 9/2002 | Gudorf et al. | ................. | 704/235 |
| 2002/0161804 A1* | 10/2002 | Chiu et al. | ..................... | 707/530 |
| 2004/0098383 A1* | 5/2004 | Tabellion et al. | ................. | 707/3 |
| 2004/0268067 A1* | 12/2004 | Yamagami | .................... | 711/159 |
| 2006/0085735 A1 | 4/2006 | Shimizu | | |
| 2007/0286032 A1* | 12/2007 | Townsend et al. | ......... | 369/27.01 |

FOREIGN PATENT DOCUMENTS

| | | |
|---|---|---|
| JP | A-6-178296 | 6/1994 |
| JP | A-10-51558 | 2/1998 |
| JP | A-2000-92048 | 3/2000 |
| JP | A-2002-132837 | 5/2002 |
| JP | A 2002-369167 | 12/2002 |
| JP | A 2003-37677 | 2/2003 |
| JP | A 2003-179849 | 6/2003 |
| JP | A-2005-130257 | 5/2005 |
| JP | A 2005-293576 | 10/2005 |
| JP | A 2005-293577 | 10/2005 |
| JP | A 2006-106902 | 4/2006 |
| WO | WO 2005/029353 A1 | 3/2005 |

OTHER PUBLICATIONS

Japanese Patent Office, *Notification for Reasons of Refusal* for Japanese Patent Application No. 2006-034587 (with English translation), Mar. 8, 2011, pp. 1-2.

* cited by examiner

*Primary Examiner* — Ian N Moore
*Assistant Examiner* — Jackie Zuniga
(74) *Attorney, Agent, or Firm* — Oliff & Berridge, PLC

(57) ABSTRACT

An information distribution system include a reporting unit that reports guide information to a user, the guide information showing information to be additionally stored in a storing unit, a receiving unit that receives identification information from the user, the identification information being associated with stored information selected by the user from the stored information shown by the guide information, and a transmitting unit that transmits suitable stored information to the user, the suitable stored information being selected from the stored information based on the identification information as to the stored information selected by the user.

14 Claims, 12 Drawing Sheets

FIG. 4

| | TIME | TITLE | DOWNLOAD |
|---|---|---|---|
| ☐ | 21:12~21:13 | July 21 2005 PBOX Architecture | Flash / FXV |
| ☐ | 21:25~21:27 | FOR DEMONSTRATION OF SALES ENGINEERS EXCHANGE | Flash / FXV |
| ☐ | 22:25~22:27 | CONFERENCE ROOM 1 | Flash / FXV |
| ☐ | 22:38~22:41 | CONFERENCE ROOM 2 | Flash / FXV |

| | TIME (62) | TITLE (63) | DOWNLOAD (64) |
|---|---|---|---|
| ☐ | 21:12~21:13 | July 21 2005 PBOX Architecture | Flash / FXV |
| ☐ | 21:25~21:27 | FOR DEMONSTRATION OF SALES ENGINEERS EXCHANGE | Flash / FXV |
| ☐ | 22:25~22:27 | CONFERENCE ROOM 1 | Flash / FXV |
| ☐ | 22:38~22:41 | CONFERENCE ROOM 2 | Flash / FXV |
| SEARCH KEYWORD | | | |

70

61 points to the checkbox column; 71 points to the search keyword input box.

INFORMATION DISTRIBUTION SYSTEM AND INFORMATION DISTRIBUTION METHOD

BACKGROUND

1. Technical Field

The present invention relates to an information distribution system and an information distribution method.

2. Related Art

In recent years, there have been systems that capture conferences and presentations in the form of digital information and record the digital information in servers. To view the data recorded in such systems, each user needs to search the subject server for desired data, and accordingly, the procedures for this search are complicated.

SUMMARY

An aspect of the present invention provides an information distribution system including: a reporting unit that reports guide information to a user, the guide information showing information to be additionally stored in a storing unit; a receiving unit that receives identification information from the user, the identification information being associated with stored information selected by the user from the stored information shown by the guide information; and a transmitting unit that transmits suitable stored information to the user, the suitable stored information being selected from the stored information based on the identification information as to the stored information selected by the user.

BRIEF DESCRIPTION OF THE DRAWINGS

Embodiments of the present invention will be described in detail based on the following figures, wherein:

FIG. 4 shows a distribution list to be distributed to each user terminal;

FIG. 6 shows a distribution list to be distributed to each user terminal;

DETAILED DESCRIPTION

Figure 1:
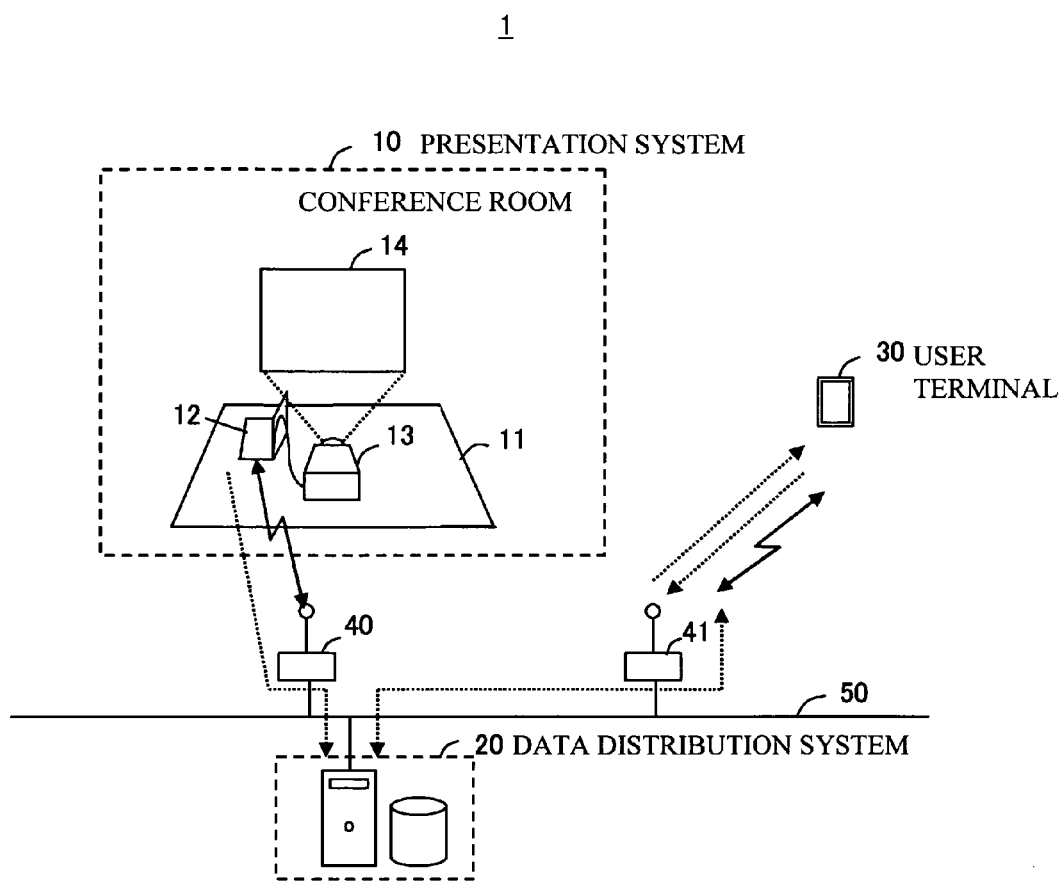
FIG. 1 illustrates the entire structure of a system in accordance with an embodiment of the present invention.

A description will now be given, with reference to the accompanying drawings, of exemplary embodiments of the present invention. FIG. 1 illustrates the entire structure of a system in accordance with an embodiment of the present invention. The system 1 includes a presentation system 10, a data distribution system 20 as an information distribution system, and a user terminal 30. The presentation system 10 includes a personal computer (PC) 12 placed on a conference table 11, a projector 13, and a screen 14. The presentation system 10 and the user terminal 30 are connected to a network 50 with wireless access points 40 and 41. This network 50 is a private network or an in-house LAN. The network 50 may be formed with cables, wireless lines, or communication lines including both cables and wireless lines.

The presentation system 10 and the user terminal 30 may be connected to the network 50 with wires. The presentation system 10 supports conferences and presentations (hereinafter referred to simply as "conferences") and captures conference data (accumulated information). The presentation system 10 sends the captured conference data to the data distribution system 20. Although only one presentation system 10 is shown in FIG. 1, two or more presentation systems may be employed in a case where two or more conference rooms exist. In such a case, one presentation system is provided in each one conference room.

The data distribution system 20 transmits accumulated conference data to the user terminal 30. The user terminal 30 holds conference data for users to view. Based on a conference data distribution list sent from the data distribution system 20, the user terminal 30 sends a conference data distribution request to the data distribution system 20, and displays the conference data distributed by the data distribution system 20. The user terminal 30 is a mobile terminal such as a notebook computer or a portable telephone. In FIG. 1, only one user terminal exchanges data with the data distribution system 20. In reality, however, two or more user terminals can exchange data with the data distribution system 20.

Figure 2:
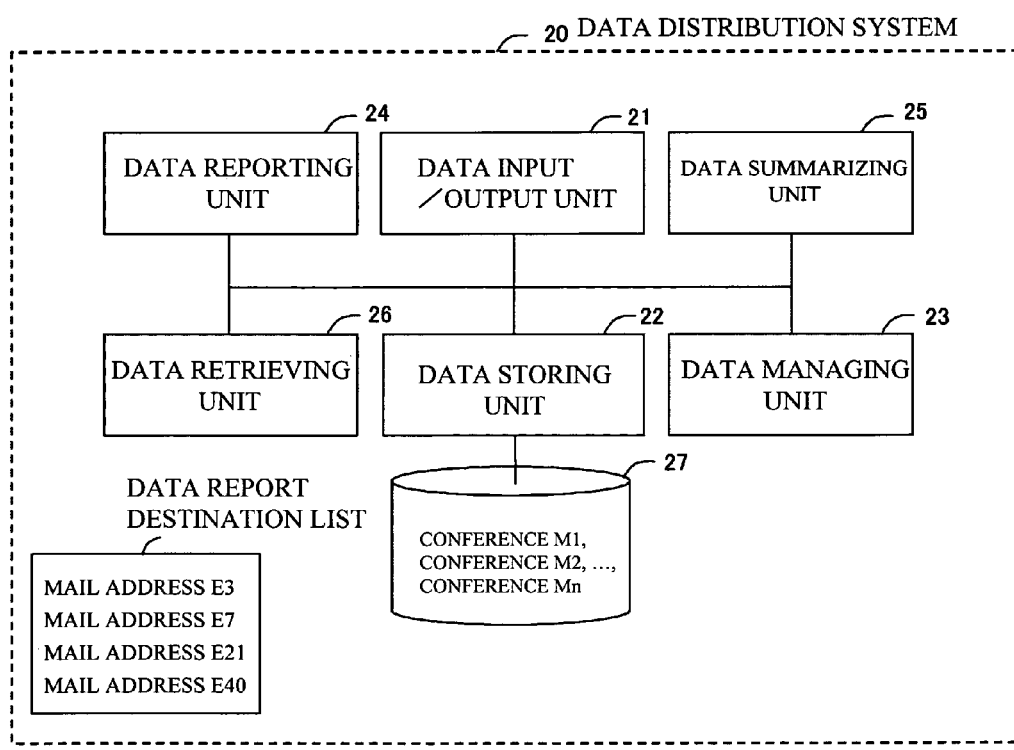
FIG. 2 illustrates the structure of the data distribution system.

Next, the data distribution system 20 is described in detail. FIG. 2 illustrates the structure of the data distribution system 20. The data distribution system 20 includes a data input/output unit 21 to serve as a receiving unit, a data storing unit 22, a data managing unit 23 to serve as a list generating unit, a data reporting unit 24 as a reporting unit and a transmitting unit, a data summarizing unit 25 to serve as a summarizing unit, a data retrieving unit 26, and a database 27. The data storing unit 22 and the database 27 constitute a storing unit.

The data input/output unit 21 inputs and outputs data via the network 50. Here, the data to be input and output by the data input/output unit 21 include search queries, the identifiers of conference data (object identifiers), attribute data, audio data, moving images, and still images. The data storing unit 22 is an interface for the database 27 that stores data such as the identifiers of conference data, attribute data, audio data, moving images, and still images that are input from the data input/output unit 21. The database 27 stores multimedia data. In a case where two or more conferences are held, the conference data relative to each of the conferences is stored in the database 27. The conference data is managed over the network, so that the conference data obtained from two or more conference rooms can be managed.

The data managing unit 23 manages the conference data stored in the database 27. Based on the conference data stored in the database 27, this data managing unit 23 generates and updates a distribution list for collectively viewing the conference data. When new conference data is added to the database 27, the data managing unit 23 adds the identifier of the new conference data to the distribution list. As the data managing unit 23 manages the position information and the attribute information as to the objects to be recorded, presentations and conferences that are held at different locations can be recorded in the database 27, and can be collectively managed. The data managing unit 23 creates written texts of the audio data of the conference data stored in the database 27 by a speech recognition technique. As for image data, the data managing unit 23 generates text data from the characters contained in the images through OCR operations, and stores the text data associated with the conference data in the database 27.

The data reporting unit 24 provides the user with guide information for reporting the conference data added to the database 27 to the user. Here, the data reporting unit 24 sends the guide information containing the distribution list for viewing the conference data stored in the database 27 by the data managing unit 23 and the referencer for accessing the conference data stored in the database 27. The data input/output unit 21 then receives the information for identifying conference data selected by the user from all the conference data reported in the guide information, and the data reporting unit 24 prepares for conference data distribution.

The data reporting unit 24 also manages a data report destination list. The data report destination list contains data report destinations, such as e-mail addresses. In the data report destination list, e-mail addresses can be registered beforehand as report destinations. In a case where a data report request and an e-mail address are received from the user terminal 30 or the like during a conference, the e-mail address is added to the data report destination list, so that the data can be reported after the conference. For example, the user operates the user terminal 30 to send a data distribution request and an e-mail address E40 to the data distribution system 20, so that the e-mail address can be added to the data report destination list.

Here, the data reporting unit 24 holds a data report list in which three e-mail addresses E3, E7, and E21 are registered beforehand, and receives an e-mail address E40 from the user terminal 30. The data input/output unit 21 transfers the distribution request and the e-mail address received from the user terminal 30 to the data reporting unit 24, which then adds the received e-mail address E40 to the data report destination list.

The data summarizing unit 25 produces a summary of each set of conference data stored in the database 27. When receiving a request for distribution of summarized conference data from the user terminal 30, the data reporting unit 24 transmits the summarized conference data to the user terminal 30 that has sent the request. If the conference data is audio data, the data summarizing unit 25 reduces the data amount by compressing the audio data through a change in the sampling rate of the audio data. If the conference data is still image data, the data summarizing unit 25 reduces the data amount by thinning the pixels in each still image. If the conference data is moving image data, the data summarizing unit 25 reduces the data amount by lowering the frame rate of the moving images. In response to a distribution request using a search keyword from the user terminal 30, the data retrieving unit 26 selects conference data by searching the text data of the corresponding conference data for the search keyword, and returns the selected conference data to the user terminal 30.

Figure 3:
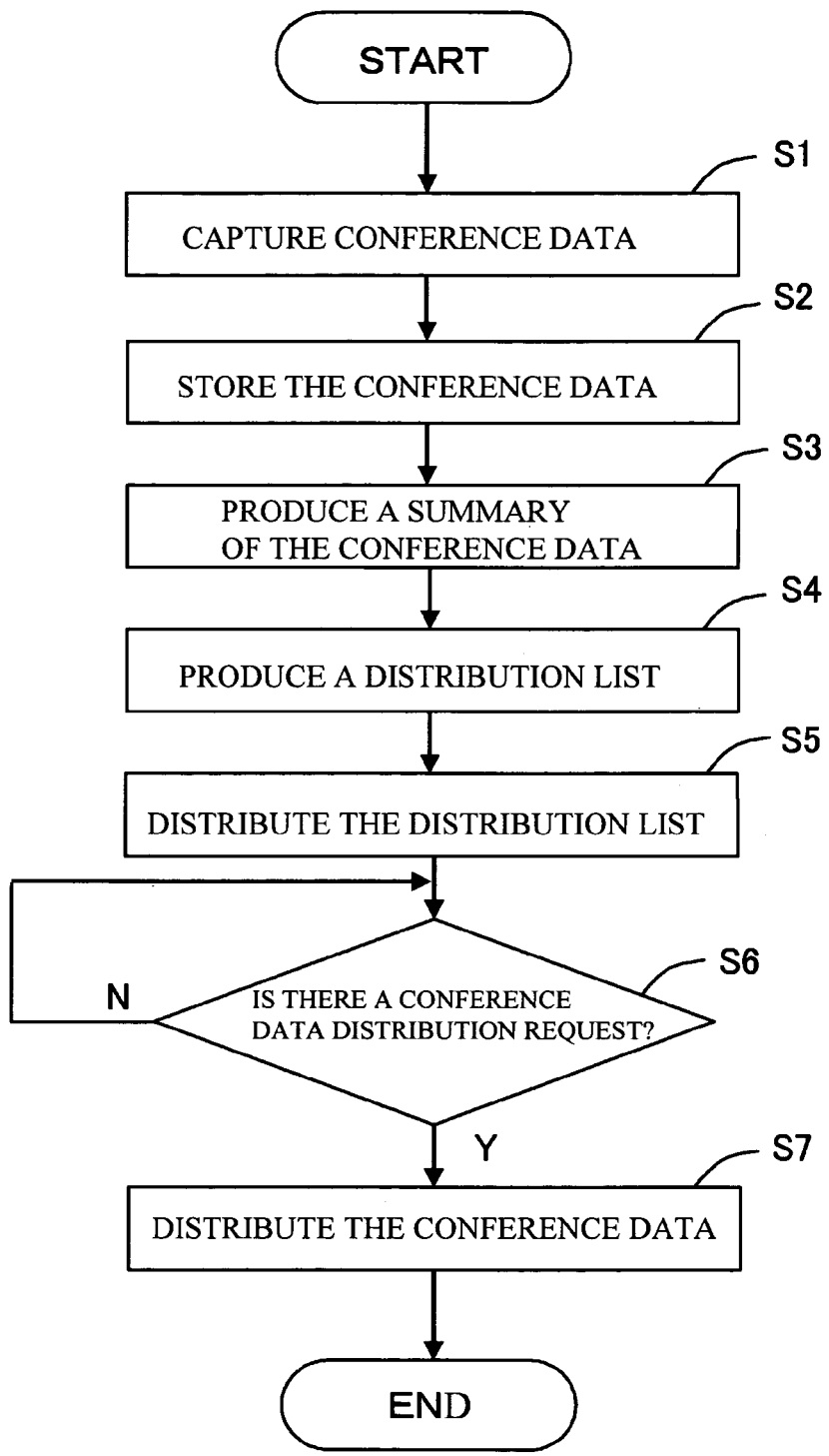
FIG. 3 is a flowchart of the operation to be performed by the system.

Next, the operation of the entire system 1 is described. FIG. 3 is a flowchart of the operation to be performed by the system 1. First, the PC 12 captures conference data through a conference data capturing operation, and sends the conference data to the data distribution system 20 (step S1). The conference data contains audio data, image data, and the data of reference materials used in the conference. In a case where two or more conferences are held, two or more sets of conference data are sent to the data distribution system 20. The data storing unit 22 stores the conference data received from the presentation system 20 in the database 27 (step S2). The data summarizing unit 25 produces a summary of the conference data stored in the database 27 (step S3). The data managing unit 23 produces a distribution list for the conference data stored in the database 27 (step S4).

The data distribution system 20 transmits the distribution list contained in the guide information to the user terminal 30 via e-mail for each receiver registered beforehand through a "push" distribution process for the distribution list (step S5). Here, the data reporting unit 24 should send the guide information containing the referencer coupled to added conference data when the new conference data is added to the database 27. With the guide information containing the distribution list, the data reporting unit 24 can also notify the user terminal 30 that the new conference data is added to the database 27. Through the "push" distribution, the data reporting unit 24 also notifies each destination registered beforehand or each destination having issued a distribution request that the new conference data is added.

FIG. 4 illustrates a distribution list 60 to be distributed to the user terminal 30. The distribution list 60 has check boxes 61 to be ticked when conference data distribution is requested, a display column 62 showing each period of time during which conference data is captured, a display column 63 showing the title of each set of conference data, and download buttons 64 for users to select a file format for downloading, such as the Flash format of Adobe Systems Incorporated. The download buttons 64 are equivalent to the referencers coupled to the conference data.

The user operates the user terminal 30 to tick the check box 61 of the conference data to be downloaded, and to push the download button 64 of the desired download format so as to send a request for distribution of the necessary conference data. When there is a conference data distribution request ("YES" in step S6), the data reporting unit 24 distributes the requested conference data to the user terminal 30, based on the referencer coupled to the conference data (step S7). In this manner, desired conference data is selected from the guide information containing the distribution list, and only the selected conference data is transmitted to the user. Thus, the user can efficiently obtain necessary conference data, and the amount of data to be transmitted to each user can be reduced.

Figure 5:
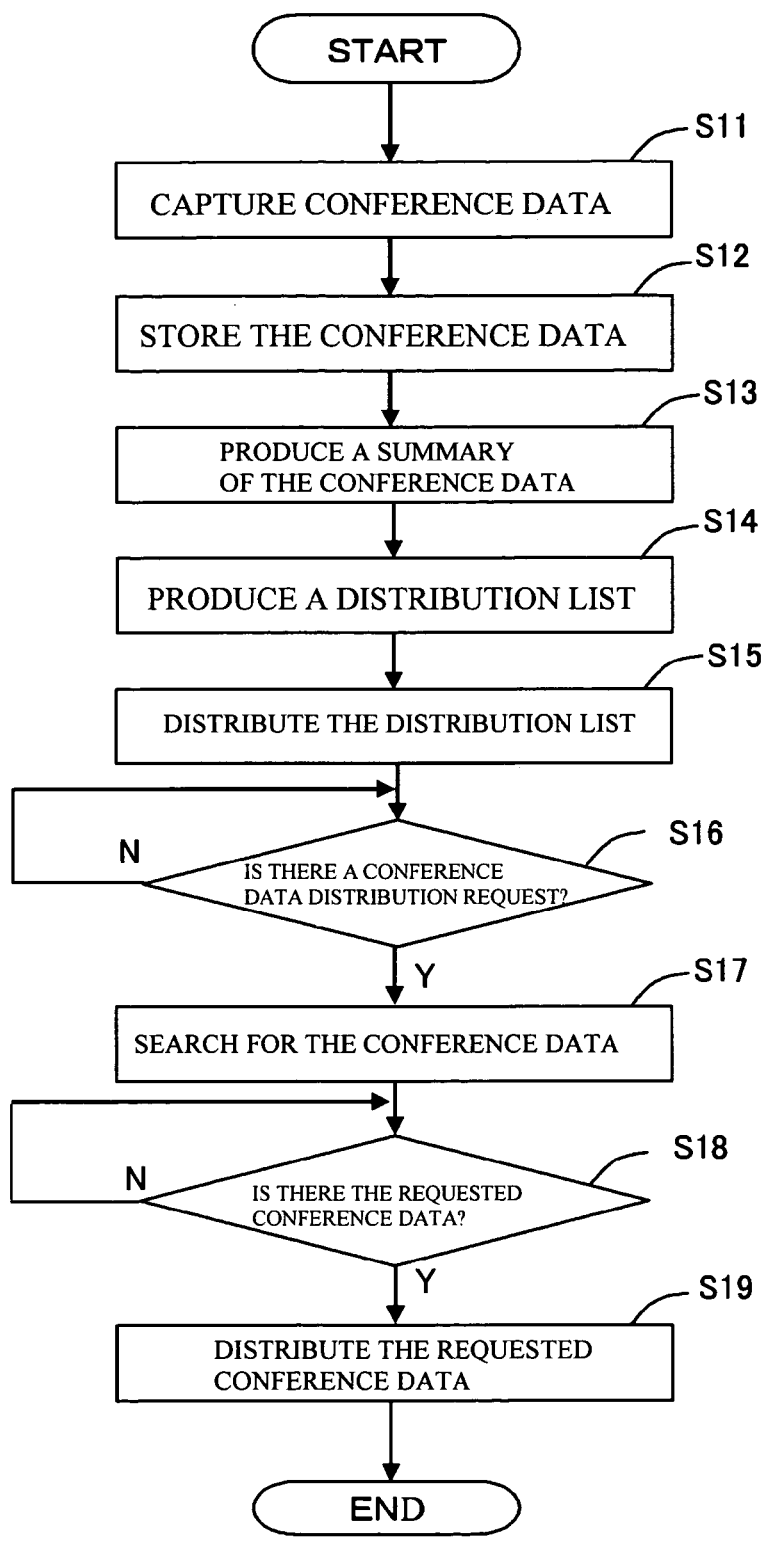
FIG. 5 is a flowchart of the operation to be performed when a conference data distribution request is made with the use of a search keyword.

Next, the operation to be performed when a conference data distribution request is made with the use of a search keyword is described. FIG. 5 is a flowchart of the operation to be performed with a conference data distribution request is made with the use of a search keyword. The PC 12 sends conference data that is the contents of the subject conference captured through a conference data capturing operation, to the data distribution system 20 (step S11). In a case where two or more conferences are held, two or more sets of conference data are sent to the data distribution system 20. The data storing unit 22 then stores the conference data received from the presentation system 20 into the database 27 (step S12). The data summarizing unit 25 produces a summary of the conference data (step S13) The data managing unit 23 produces a distribution list for the conference data stored in the database 27 (step S14).

The data distribution system 20 transmits the guide information containing the distribution list to the user terminal 30 via e-mail for each receiver registered beforehand through a "push" distribution process for the distribution list (step S5). FIG. 6 shows a distribution list 70 to be distributed to the user terminal 30. A search keyword input box 71 for inputting a search keyword is added to the distribution list 70. The user operates the user terminal 30 to tick the check box 61 of the conference data to be downloaded and to input a keyword for a desired search in the search keyword input box 71 on the screen of the user terminal 30. The user then pushes the download button 64 for the desired download format, so as to make a conference data distribution request.

When there is a conference data search request ("YES" in step S16), the data retrieving unit 26 searches for the conference data having its check box ticked on the distribution list 70, using the search keyword (step S17). If there is the desired conference data ("YES" in step S18), the data reporting unit 24 distributes the desired conference data to the user terminal 30 in accordance with the result obtained with the search keyword (step S19). To reduce the amount of data to be distributed, the data reporting unit 24 may send summarized data of the conference data to the user terminal 30, instead of sending the conference data.

Figure 7:
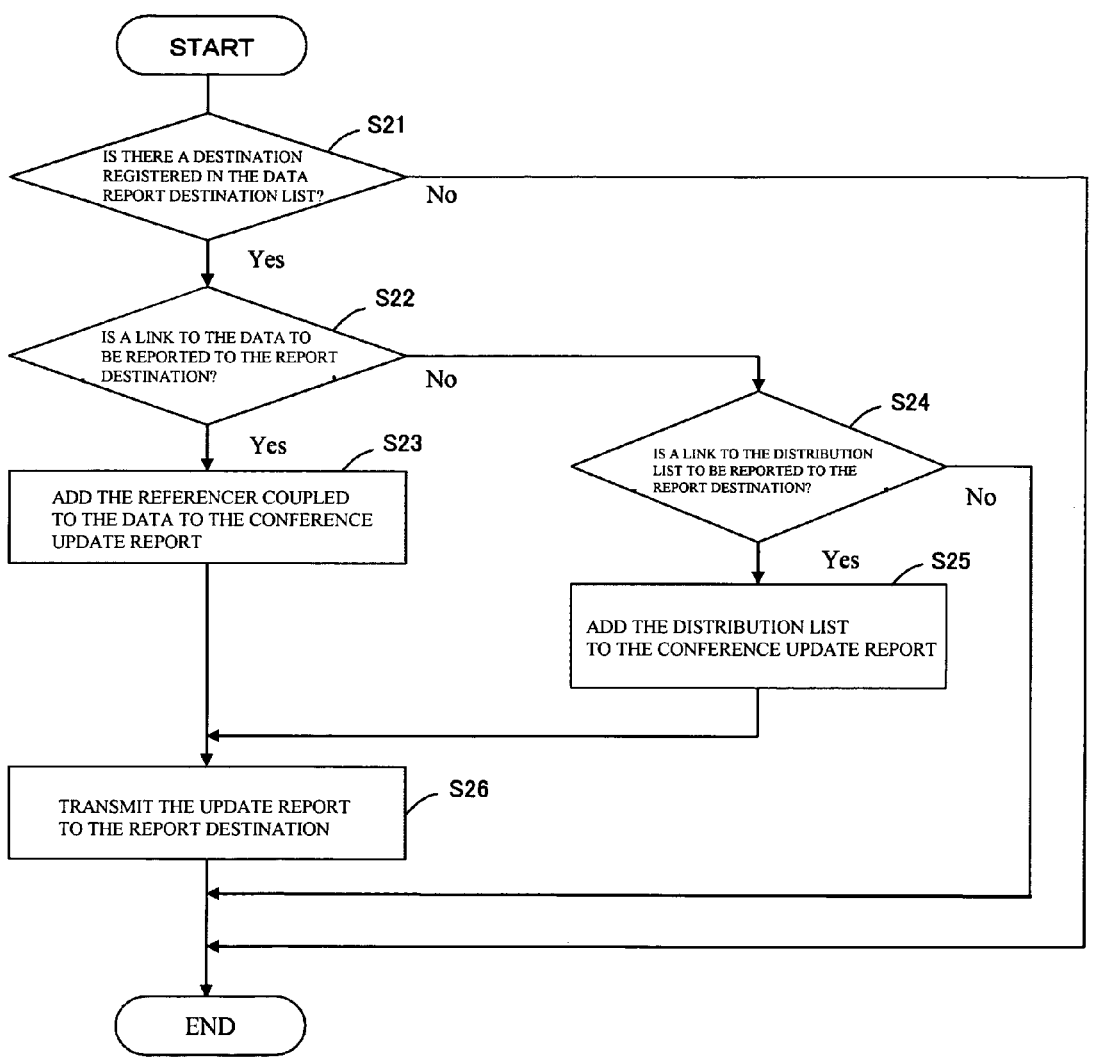
FIG. 7 is a flowchart of a "push" distribution operation based on a report destination list.

Next, the "push" distribution based on a distribution destination list is described. FIG. 7 is a flowchart of the "push" distribution operation based on a distribution destination list. When there is a destination registered in the data destination list (step S21), the data reporting unit 24 determines whether to report the referencer (a link) coupled to the conference data to the user terminal 30 of a report destination (step S22). If the referencer coupled to the conference data is to be reported to the report destination, the referencer coupled to the conference data is added to the conference update report (step S23). If the referencer coupled to the conference data is not to be reported to the report destination, the data reporting unit 24 determines whether to report the referencer coupled to the distribution list to the report destination (step S24). If the referencer coupled to the distribution list is to be reported to the report destination, the distribution list is added to the conference update report (step S25). In step S26, the data reporting unit 24 transmits the conference update report to the user terminal 30 of the report destination, and ends the "push" distribution operation based on the report destination list. The information to be reported to a destination registered on the data report destination list is referred to as the conference update report. In view of this, the distribution list is contained in the conference update report, but the referencers coupled to other data are also contained in the conference update report.

Figure 8:
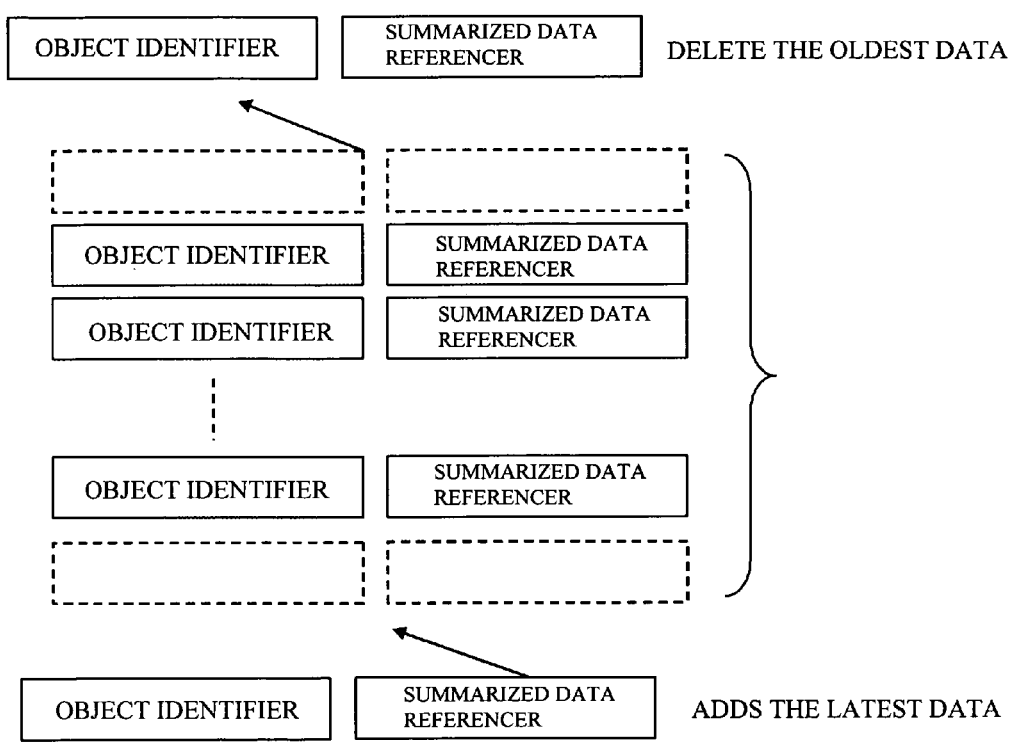
FIG. 8 is a schematic view of a data list to be managed by the data managing unit.

FIG. 8 is a schematic view of the distribution list managed by the data managing unit 23. As described above, the data managing unit 23 manages the distribution list. The distribution list has sets of elements, and each one set consists of an identifier (object identifiers) of conference data, such as the generating time, the generation place, or the generation circumstances of the conference data, and a referencer coupled to the summarized data generated by the data summarizing unit 25. As shown in FIG. 8, when the number of elements contained in the distribution list exceeds a predetermined number, the data managing unit 23 adds the identifier of the conference data as the latest element, and erases the identifier of the conference data as the oldest element, so that the number of elements in the distribution list is maintained less than the predetermined number of elements. Thus, the amount of data to be distributed can be reduced.

Figure 9:
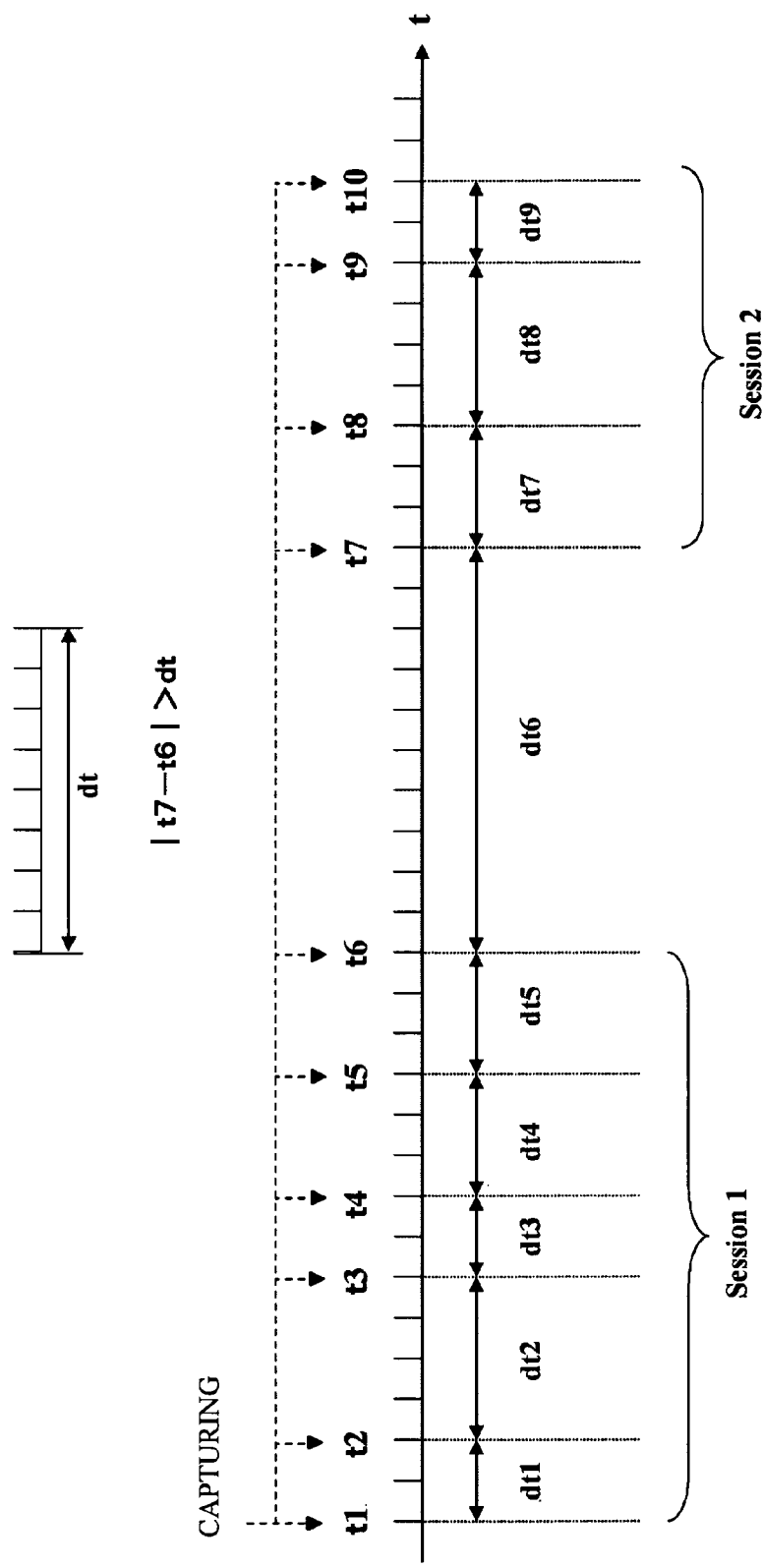
FIG. 9 shows divided sessions.

FIG. 9 illustrates divided sessions. In the example illustrated in FIG. 9, sessions are divided based on time. In a case where one set of conference data stored in the database 27 contains data that lasts longer than a predetermined period of time, the data managing unit 23 divides the set of conference data containing two or more kinds of data into two different sets of conference data, with the data at which the set of conference data is divided lasting longer than the predetermined period of time. The two different sets of conference data are then stored in the database 27. More specifically, the data managing unit 23 divides one set of conference data at the point where $|t(1+1)-t1|>=dt$, with dt representing the predetermined period of time, t1 representing the time when first data is added, t2 representing the time when second data is added, t3 representing the time when third data is added, t4 representing the time when fourth data is added, t5 representing the time when fifth data is added, t6 representing the time when sixth data is added, t7 representing the time when seventh data is added, t8 representing the time when eighth data is added, t9 representing the time when ninth data is added, and 1 being 1 to 8.

In the example illustrated in FIG. 9, since the period of time dt6 between t6 and t7 exceeds the predetermined period of time dt, one set of conference data is divided into session 1 lasting from t1 to t6 and session 2 lasting from t7 to t10, with dt6 being the boundary. Each of the elements (dt1, dt2, . . . , dt9) in FIG. 9 are not independent pieces of conference data, but the intervals at which the data constituting the conference data of one continuous conference is updated. In the example illustrated in FIG. 9, dt6 is larger than dt in the one set of conference data consisting of dt1+dt2+. . . +dt9. Therefore, the one set of conference data is divided into two sessions of (dt1+dt2+dt3+dt4+dt5) and (dt7+dt8+dt9). Here, dt6 is discarded as an intermission between two conferences, rather than a piece of conference data.

Figure 10:
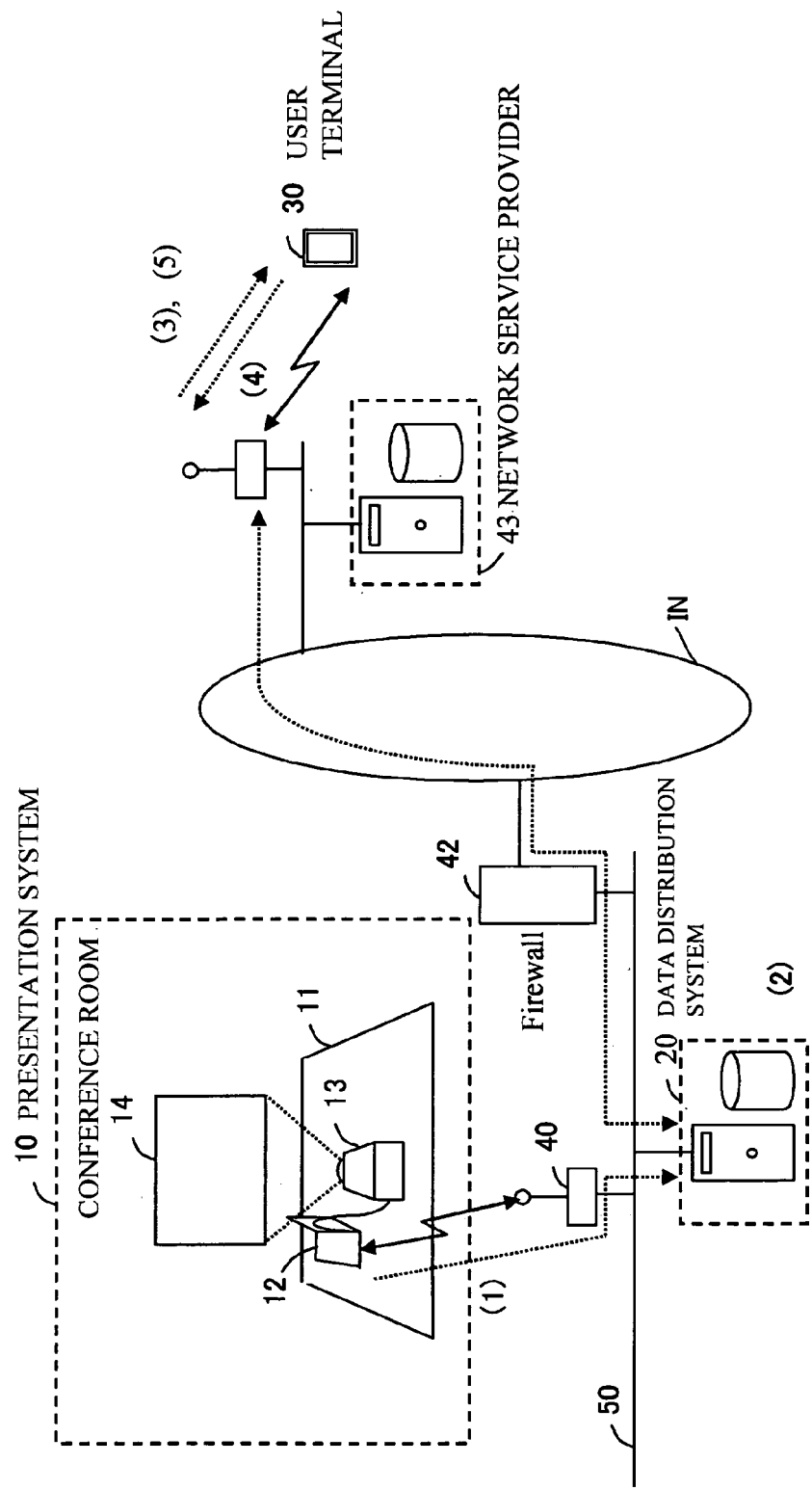
FIG. 10 illustrates an example structure of a system in accordance with another embodiment of the present invention.

FIG. 10 illustrates an example structure of a system 100 in accordance with another embodiment of the present invention. In this structure, a presentation system 10 is connected to a network 50 via a wireless access point 40 or via wires. A user terminal 30 is connected to a network service provider 43 wirelessly or with wires. The network service provider 43 is connected to a private network or an in-house LAN 50 via a firewall 42.

A PC 12 transmits conference data captured through a conference capturing operation to the data distribution system 20 (this process being denoted by (1) in FIG. 10). The data distribution system 20 stores the received conference data in the database 27, produces a summary of the conference data, and then produces a distribution list (2). In a "push" distribution process for the distribution list, the data distribution system 20 transmits the distribution list to the user terminal 30 via e-mail through the network service provider 43 for each receiver registered in advance (3).

In a data distribution requesting process, the user requests for distribution of conference data selected from the received distribution list (4). In a data distribution process, the data distribution system 20 distributes the requested conference data to the requester (5). The data distribution system 20 and the presentation system 10 may be connected to the Internet without a firewall.

Figure 11:
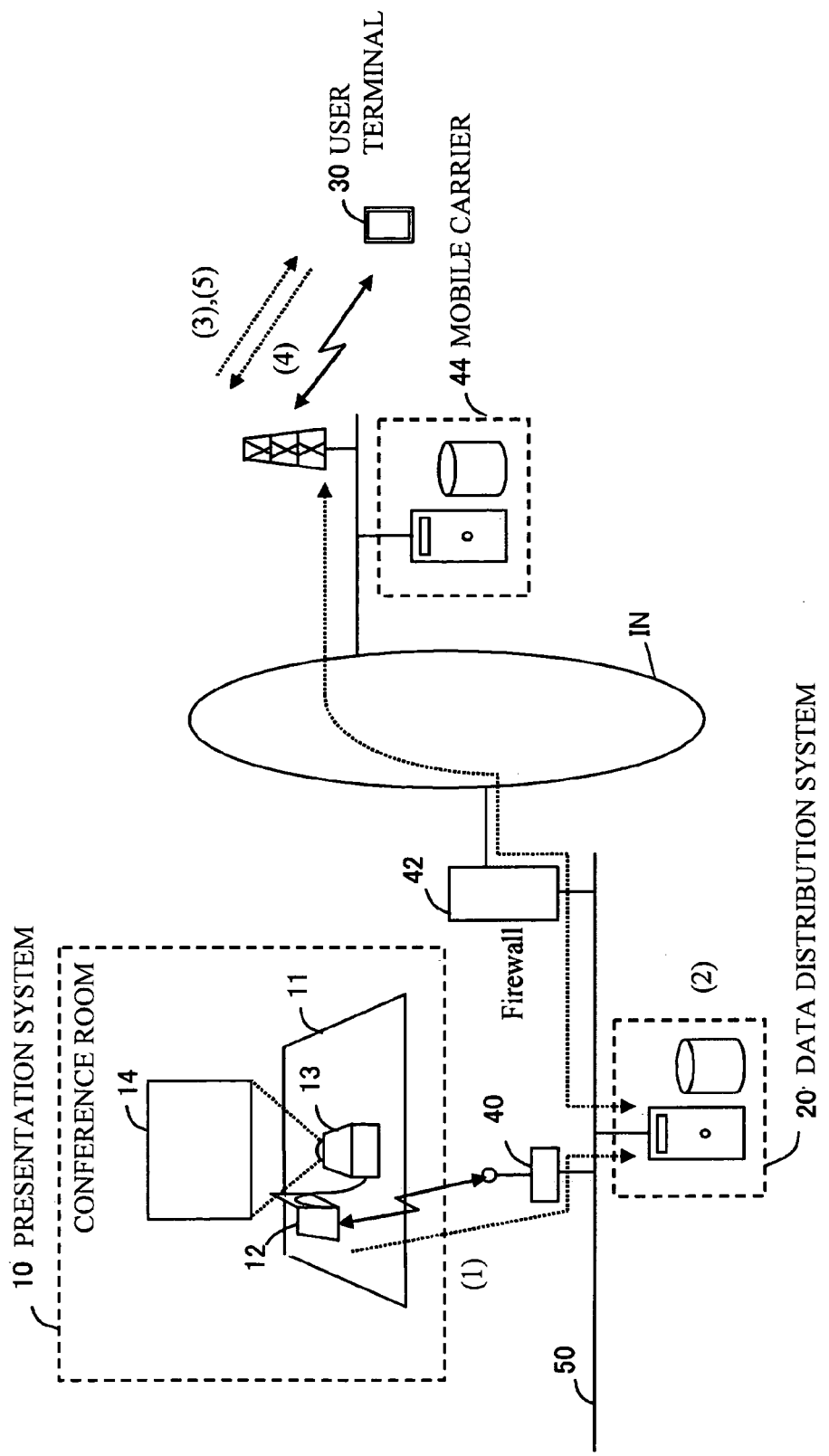
FIG. 11 illustrates an example structure of a system in accordance with yet another embodiment of the present invention.

FIG. 11 illustrates an example structure of a system 200 in accordance with yet another embodiment of the present invention. In this structure, a user terminal 30 is connected to a mobile carrier 44 wirelessly or with wires. The mobile carrier 44 is connected to a private network or an in-house LAN 50 via the firewall 42.

A PC 12 transmits conference data captured through a conference capturing operation to the data distribution system 20 (1). The data distribution system 20 stores the received conference data in the database 27, produces a summary of the conference data, and then produces a distribution list (2). In a "push" distribution process for the distribution list, the data distribution system 20 transmits the distribution list to the user terminal 30 via e-mail through the mobile carrier 44 for each receiver registered in advance (3).

In a data distribution requesting process, the user requests for distribution of conference data selected from the received distribution list through the mobile carrier 44 (4). In a data distribution process, the data distribution system 20 distributes the requested conference data to the requester through the mobile carrier 44 (5). The data distribution system 20 and the presentation system 10 may be connected to the Internet IN without a firewall.

Figure 12:
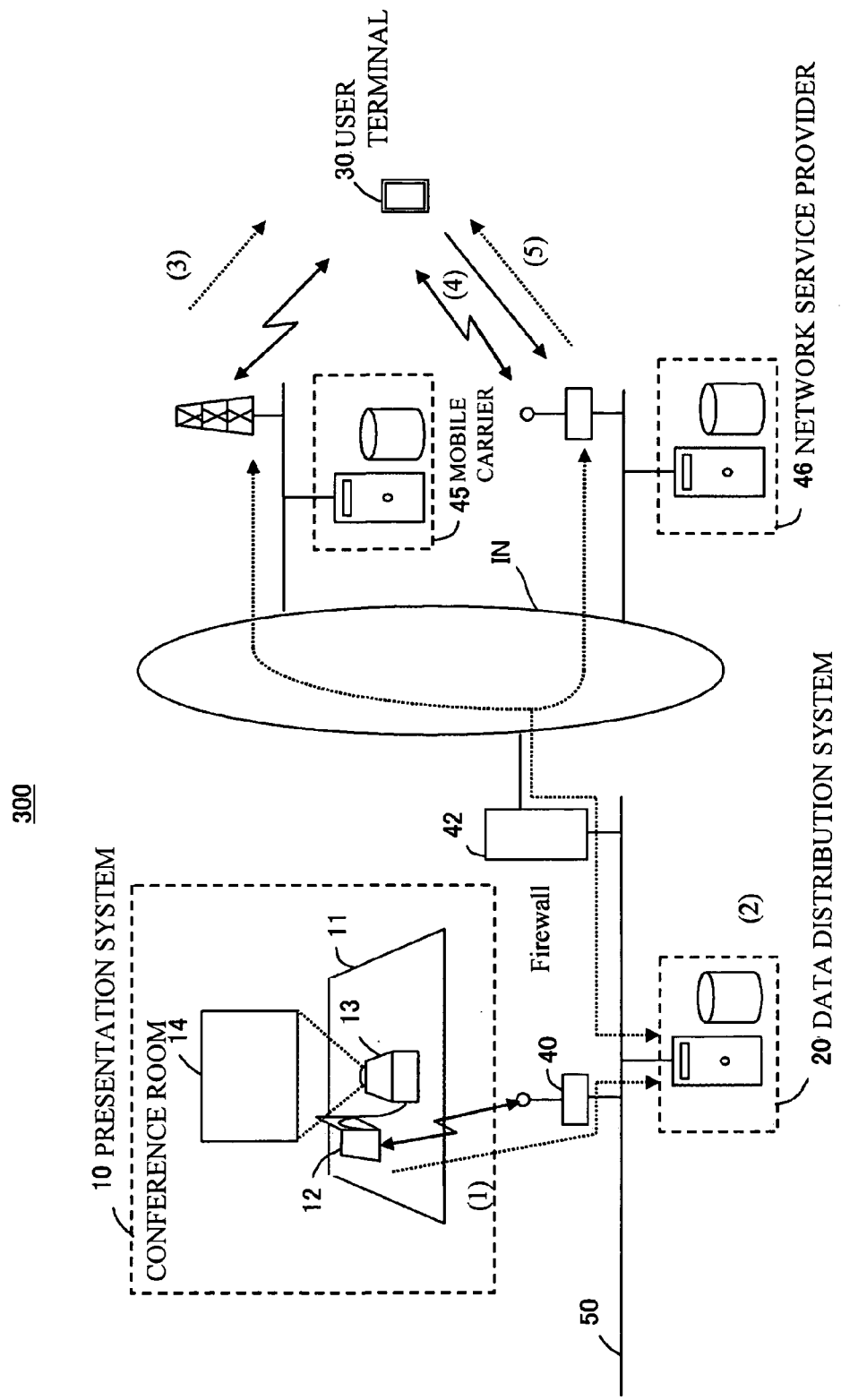
FIG. 12 illustrates an example structure of a system in accordance with still another embodiment of the present invention.

FIG. 12 illustrates an example structure of a system 300 in accordance with still another embodiment of the present invention. In this structure, a user terminal 30 is connected to a network 50 via a mobile carrier 45 and a network service provider 46. The mobile carrier 45 and the network service provider 46 are connected to the network 50 via the firewall 42.

A PC 12 transmits conference data captured through a conference capturing operation to the data distribution system 20 (1). The data distribution system 20 stores the received conference data in the database 27, produces a summary of the conference data, and then produces a distribution list (2). In a "push" distribution process for the distribution list, the data distribution system 20 transmits the distribution list to the user terminal 30 via e-mail through the mobile carrier 45 for each receiver registered in advance (3).

In a data distribution requesting process, the user requests for distribution of conference data selected from the received distribution list through the network service provider 46 (4). In a data distribution process, the data distribution system 20 distributes the conference data to the requester through the network service provider 46 (5). The data distribution system 20 and the presentation system 10 may be connected to the Internet IN without a firewall.

As described above, in accordance with this embodiment, electronic mail to be sent contains the referencer to desired conference data, so that the conference data stored in the data distribution system 20 can be easily accessed or downloaded in accordance with the received referencer to the conference data. Since the electronic mail also contains the referencer to the summary of necessary conference data, the necessary of the necessary conference data can be easily accessed even if more than one set of conference data is reported. Thus, even if the user does not participate in the conference, the user can selectively retrieve desired information from the distribution list sent after the conference.

In the case where the moving images, the audio data, the still images of a given conference, the conference materials containing those data, and the information as to the links to the summary of those data, are automatically reported, after the conference, to the participants of the conference and those who have registered in advance, and each of those who have received the report adds a keyword to a given distribution link containing the report and makes a request, only the information containing the keyword among the link destination information stored in the data distribution system 20 is distributed so that the information can be retrieved only when the keyword matches the reported information through a filtering operation. Thus, time and money can be saved in a case where data is retrieved through a costly communication line such as a cellular phone carrier.

The data storing unit 22 can also capture conference data offline. Accordingly, the data storing unit 22 can store not only conference data that is input via the network 50, but also conference data that is input offline without intervention by the network 50, into the database 27. In the above described embodiment, the data reporting unit 24 reports to users via e-mail. However, the data reporting unit 24 may report to users by other means than e-mail.

When notifying users that new conference data is added to the database 27, the data reporting unit 24 may change data that is to be distributed, depending on the characteristics of each device on the receiving end. By doing so, the amount of data to be viewed does not exceed the capacity of the device even if the user terminal 30 is a device with small capacity, such as a cellular phone, and the user can smoothly view the conference data. Further, the data reporting unit 24 may report addition of conference data to each user, as soon as more than one set of relevant conference data is added to the database 27. Based on the report, each user can determine whether to collectively view all the relevant conference data.

Although the referencer to conference data is contained in the distribution list to be transmitted in the above described embodiment, it is also possible to send direct links to conference data, instead of the distribution list, to the user terminal 30, as soon as the conference data is added.

When reporting that new conference data is added, the data reporting unit 24 may change conference data that is to be distributed, depending on the characteristics of the user terminal 30. Also, since the data reporting unit 24 reports data by the session, addition of data is reported when more than one set of relevant data is added.

Although the data summarizing unit 25 summarizes each set of conference data stored in the database 27 in the above described embodiment, the data summarizing unit 25 may produce a summary of more than one set of conference data stored in the database 27. By doing so, the amount of data to be distributed can be further reduced. The data summarizing technique utilized by the data summarizing unit 25 may be the summarizing technique disclosed in Japanese Patent Application Publication No. 2003-179849 or any of the summarizing techniques disclosed in Japanese Patent Application Publication No. 2006-106902 (by the same applicant as the applicant of this patent application) and Japanese Patent Application Publication No. 2005-293576 and Japanese Patent Application Publication No. 2005-293577.

Although the data stored in the database 27 is conference data in the above described embodiment, it is not limited to conference data, and any type of information to which data is added with time may be stored in the database 27.

The information distribution method in accordance with the present invention is practiced by the data distribution system 20. The data distribution system 20 may be formed with a CPU (Central Processing Unit), a ROM (Read Only Memory), a RAM (Random Access Memory), and the likes. As the CPU executes the program, the steps in the information distribution method are carried out.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information distribution system comprising:
   a processor, wherein the processor further includes:
   a reporting unit that reports guide information to a user, the guide information showing information to be additionally stored in a storing unit, the storing unit storing audio, still image, and moving image data related to the guide information for the user to access, the audio, moving image, and still image data being automatically extracted and converted into text for a user to read while reviewing the audio, moving image, and still image data, wherein the guide information reported by the reporting unit contains a distribution list for viewing two or more sets of conference data and a plurality of referencers for accessing the two or more sets of conference data;

a list generating unit that generates the distribution list for collectively showing information stored in the storing unit, the distribution list containing a selecting portion for selecting one or more referencers from the plurality of referencers, an input portion for inputting a search keyword, and a download button for selecting a file format for downloading the stored information associated with the selected referencers, wherein the distribution list is transmitted to a user terminal via email;

a receiving unit that receives identification information from the user, the identification information being associated with the stored information and includes the one or more referencers from the plurality of referencers, an input search keyword and a selected file format directly selected by the user from the distribution list contained in the guide information;

a transmitting unit that transmits suitable stored information to the user terminal, the suitable stored information being selected from the stored information based on the identification information received by the receiving unit, wherein the transmitting unit searches the stored information for the suitable stored information based on the one or more selected referencers from the plurality of referencers, the suitable stored information having the input search keyword, and transmits the suitable stored information in the selected file format to the user terminal; and a managing unit that divides a set of stored information based upon a length of time into at least two different sessions of information when the set of stored information stored in the storing unit contains plural sets of media data having a non uniform interval of time and at least one of an accumulation of the plural sets of data having the non uniform interval of time lasts longer than a predetermined period of time, and stores the two different sessions of information in the storing unit, the managing unit discards a single set of media data if the single set of media data is larger than a specified interval of time in a set of conference data.

2. The information distribution system according to claim 1, further comprising a summarizing unit that produces a summary of each suitable piece of information among the information stored in the storing unit, based on the identification information as to the stored information selected by the user,
wherein the transmitting unit transmits the summary of each suitable piece of information, instead of the stored information, to the user terminal.

3. The information distribution system according to claim 1, further comprising a summarizing unit that produces a summary of each suitable piece of information among the information stored in the storing unit, based on the identification information as to the stored information selected by the user,
wherein the reporting unit transmits the summary of each suitable piece of information, instead of the stored information, to user terminal.

4. The information distribution system according to claim 1, wherein the reporting unit reports the guide information to the user terminal via electronic mail.

5. The information distribution system according to claim 1, wherein the reporting unit reports the guide information to the user, when stored information is newly stored in the storing unit.

6. The information distribution system according to claim 2, wherein the managing unit manages a list having sets of elements, each of the sets of elements consisting of an identifier of the stored information and a coupled referencer coupled to the summary of each suitable piece of information generated by the summarizing unit, and
wherein the managing unit adds the identifier of the stored information of a latest element and erases the identifier of the stored information of an oldest element when a number of elements on the list exceeds a predetermined number, so as to maintain the number of elements on the list less than the predetermined number.

7. The information distribution system according to claim 1, wherein the reporting unit notifies the user that the stored information is newly added to the storing unit.

8. The information distribution system according to claim 1, wherein the reporting unit notifies the user of a reference coupled to the stored information, when the stored information is newly added to the storing unit.

9. The information distribution system according to claim 1, wherein the reporting unit has the guide information containing a referencer coupled to the distribution list, when an addition of the stored information to the storing unit is reported.

10. The information distribution system according to claim 1, wherein the reporting unit changes data to be distributed in accordance with characteristics of a device on a receiving end, when an addition of the stored information to the storing unit is reported.

11. The information distribution system according to claim 1, wherein the reporting unit reports the guide information to the user, when plural sets of relevant data are added to the storing unit.

12. The information distribution system according to claim 1, wherein the storing unit captures the stored information offline.

13. The information distribution system according to claim 1, wherein the stored information is conference data.

14. An information distribution method comprising:
reporting guide information to a user, the guide information showing information to be additionally stored in a storing unit, the storing unit storing audio, still image, and moving image data related to the guide information for the user to access, the audio, moving image, and still image data being automatically extracted and converted into text for a user to read while reviewing the audio, moving image, and still image data, wherein the reported guide information contains a distribution list for viewing two or more sets of conference data and a plurality of referencers for accessing the two or more sets of conference data;

generating the distribution list for collectively showing information stored in the storing unit, the distribution list containing a selecting portion for selecting one or more referencers from the plurality of referencers, an input portion for inputting a search keyword, and a download button for selecting a file format for downloading the stored information associated with the selected referencers, wherein the distribution list is transmitted to a user terminal via email;

receiving identification information from the user, the identification information being associated with the stored information and includes the one or more referencers from the plurality of referencers, an input search keyword and a selected file format directly selected by the user from the distribution list contained in the guide information;

transmitting suitable stored information to the user terminal, the suitable stored information being selected from the stored information based on the identification information received by the receiving unit, wherein the transmitting unit searches the stored information for the suitable stored information based on the one or more selected referencers from the plurality of referencers, the suitable stored information having the input search keyword, and transmits the suitable stored information in the selected file format to the user terminal;

dividing a set of stored information based upon a length of time into at least two different sessions of information when the set of stored information stored in the storing unit contains plural sets of media data having a non uniform interval of time and at least one of an accumulation of the plural sets of data having the non uniform interval of time lasts longer than a predetermined period of time;

storing the two different sessions of information in the storing unit;

discarding a single set of media data if the single set of media data is larger than a specified interval of time in a set of conference data; and wherein the above steps are performed by a processor.

* * * * *